(No Model.)

C. C. ALDRICH.
BEEHIVE.

No. 557,532.  Patented Apr. 7, 1896.

Witnesses
Bessie B Nelson
A D Merchant

Inventor
Cyrus C Aldrich
By his Attorney
Jas. F. Williamson

UNITED STATES PATENT OFFICE.

CYRUS C. ALDRICH, OF MORRISTOWN, MINNESOTA.

BEEHIVE.

SPECIFICATION forming part of Letters Patent No. 557,532, dated April 7, 1896.

Application filed August 23, 1895. Serial No. 560,233. (No model.)

*To all whom it may concern:*

Be it known that I, CYRUS C. ALDRICH, a citizen of the United States, residing at Morristown, in the county of Rice and State of Minnesota, have invented certain new and useful Improvements in Beehives; and I do hereby declare the following to be a full, clear, and exact description of the invention, such as will enable others skilled in the art to which it appertains to make and use the same.

My invention has for its object to provide an improved beehive; and the invention consists of certain novel features of construction which will be hereinafter described, and defined in the claims.

The invention is illustrated in the accompanying drawings, wherein, like letters referring to like parts throughout the several views—

Figure 1:
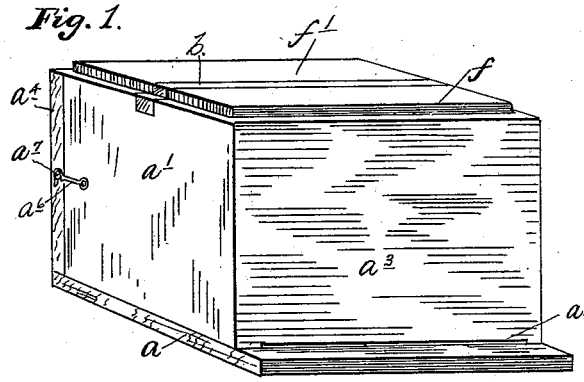
Figure 3:
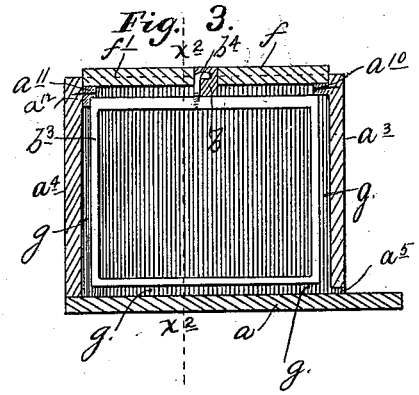
Figure 4:
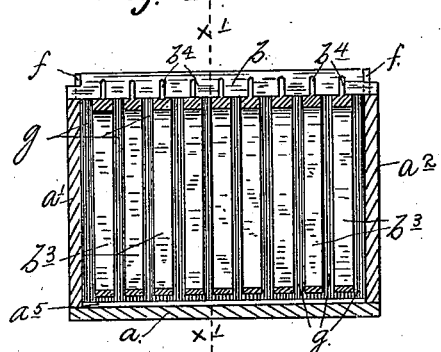
Figure 2:
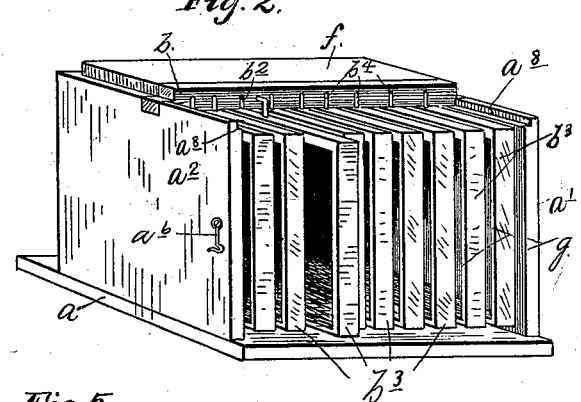
Figure 6:
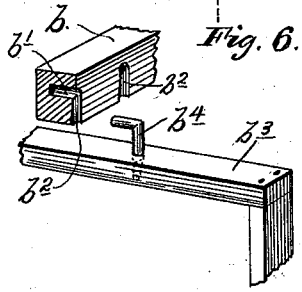
Figure 5:
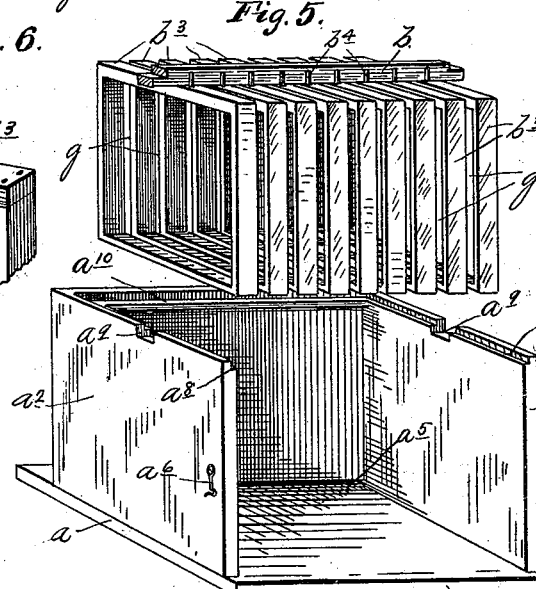
Figure 7:
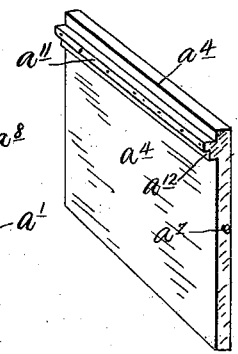

Figure 1 is a perspective view of a portion of my improved hive, looking from the front. Fig. 2 is a perspective view of the same, looking from the rear, with the door or removable wall and one of the honey-boards removed and with one of the comb-frames partially pulled out. Fig. 3 is a vertical section from front to rear through the hive on the line $x'\ x'$ of Fig. 4, or parallel with one of the comb-frames, as shown, for example, in Fig. 2. Fig. 4 is a vertical section at right angles to the comb-frames, or on the line $x^2\ x^2$ of Fig. 3. Fig. 5 is perspective view, looking from the rear at the hive or hive-section, with the comb-frames collectively withdrawn or lifted out from the body of the hive after the door and the honey-boards have been removed. Fig. 6 is a detail in perspective showing the comb-frame hooks and the hook-seats for the same in the top bar or girder, and Fig. 7 is a detail in perspective showing the removable door or wall detached.

The outside cover for the hive proper is not shown in the drawings. This cover may be of any suitable form which will afford the proper protection from the weather.

$a$ represents the base-board, and $a'$, $a^2$, $a^3$, and $a^4$ represent the vertical walls of the hive, of which parts $a'$ and $a^2$ represent the side walls, $a^3$ represents the front wall, and $a^4$ the rear wall, of the hive. The base-board is, of course, of greater length from front to rear than the corresponding dimension of the body of the hive, so as to afford the necessary projecting ledge or alighting-place for the bees at the front of the hive. The front board $a^3$ is provided with the ordinary or any suitable entrance-slot $a^5$, and the rear board or wall $a^4$ is detachably securable to the side walls $a'$ and $a^2$ by means of hooks $a^6$, shown as pivoted to the side boards and engageable with set-screws $a^7$ or other suitable devices on the ends of the back board. The back board $a^4$ is therefore readily removable at will and constitutes a door for access to the interior of the hive, when desired, for the removal of the comb-frames or other purposes.

The side walls $a'$ and $a^2$ are rabbeted, as shown at $a^8$, and are also notched on their upper edges, as shown at $a^9$. The front board $a^3$ is provided on its inner surface and near its top with an inwardly-projecting cleat $a^{10}$. The back board or door $a^4$ is provided on its inner surface and near its top with an inwardly-projecting cleat $a^{11}$, which is rabbeted, as shown at $a^{12}$.

A top bar or girder $b$ fits in the notches $a^9$ of the side boards $a'$ and $a^2$ and is provided with a series of hook-seats, composed of the horizontal seat portions $b'$ and the vertical countersunk portions $b^2$, as best shown in Fig. 6. The rectangular comb-frames $b^3$ are provided on their top bars with screw-hooks $b^4$, which are adapted to work in the seats $b'$ $b^2$ of the top bar or girder $b$ and suspend or support the comb-frames $b^3$ therefrom. The hook-seats $b'\ b^2$ are so located with respect to each other as to properly space the comb-frames $b^3$ apart from each other when in working position on the bar $b$. The hooks $b^4$ are preferably made of wire on account of cheapness. The rear ends of the upper corners of the comb-frames $b^3$ work in the rabbeted seat $a^{12}$ of the door-cleat $a^{11}$, and the forward upper corners of the comb-frames $b^3$ work under and against the cleat $a^{10}$ of the front board $a^3$. The rabbeted seat $a^{12}$ of the cleat $a^{11}$ prevents the backward or upward movement of the comb-frames at their rear ends. The hooks $b^4$, in coöperation with the bar $b$, prevent the forward movement of the comb-frames $b^3$ beyond their proper working position, and the cleat $a^{10}$ on the front board $a^3$ prevents the comb-frames from rising or tilting upward at their forward ends.

$ff'$ are a pair of honey-boards or top boards which are applied on opposite sides of the bar $b$, with their ends resting on the rabbeted seats $a^8$ of the side walls $a'$ and $a^2$. The front member $f$ of the said honey-boards also rests at its forward margin on the cleat $a^{10}$ of the front wall $a^3$ of the hive. The rear member $f'$ of the said honey-boards rests with its rear margin on the top of the door-cleat $a^{11}$.

With this construction, when the parts are all in working position, the comb-frames are suspended from their central points by the hooks $b^4$ from the overhead girder or top bar $b$ and are held from tilting motion or forward or rearward motion by the coöperation of the cleats $a^{10}$ and $a^{11}$ with the top bar $b$ and the hooks $b^4$. The honey-board $f'$ locks the hooks $b^4$ in their seats $b'$ $b^2$, as best shown in Fig. 3, and serves also to form a shield or cover for the said seats, which prevents the bees from gluing the hooks to their seats by propolis.

The comb-frames $b^3$ are, of course, of less size than the hive and are properly spaced and hung, so as to afford the requisite bee-spaces $g$ between the comb-frames themselves and between the comb-frames and the walls of the hive.

It is obvious that when the parts above described are put together, as shown in Figs. 1 and 3, a complete hive or hive-section will be afforded. It is also obvious that by the removal of the rear board or door $a^4$ and the rear member $f'$ of the top or honey board the comb-frames $b^3$ may be readily removed from the hive one at a time, as shown in Fig. 2. It must also be obvious that by the removal of the back door or board $a^4$ and both of the honey-boards $ff'$ the comb-frames $b^3$ can be collectively removed together with the top bar $b$, as shown in Fig. 5. The fact that the comb-frames $b^3$ are so mounted or supported as to afford an extremely small amount of surface to which the bees can apply propolis for gluing the same fast to relatively-fixed parts of the hive or hive-section is a material advantage both to the apiarist and to the bees. The bees are saved unnecessary work or waste of propolis, and the apiarist can more readily manipulate the comb-frames. The few points to which the propolis can be applied by the bees are so related to the comb-frames $b^3$ that a large leverage is afforded by the frames for the ready detachment of the same from the glued point. Of course as the propolis cannot be applied to the hooks $b^4$ and their seats $b'$ $b^2$ in the bar $b$ no resistance or difficulty is offered to the removal of the hooks from their seats, and the hook-seats always remain clear, so as not to require cleaning for the return of the comb-frames into working postion.

As shown, the above-described device is designed as a brood-chamber, but may be used as a super by simply leaving off the alighting-board. If desired, the complete hive may be formed by placing two of these hive-sections one on top of the other and providing suitable bee-passages between said sections, or the device shown may be used itself as a complete hive.

It is of course apparent that the hive is a cheap one to make.

In every way, therefore, my improved hive, as herein described, is a convenient, economical, and durable hive.

What I claim, and desire to secure by Letters Patent of the United States, is as follows:

1. In a beehive, the combination with an overhead support provided with hook-seats, of removable comb-frames having hooks adapted to engage said seats and removably support said frames, and a guard or shield which covers the hooks and hook-seats and prevents the bees from gluing said hooks fast to said seats by propolis, substantially as described.

2. In a beehive, the combination with a top bar or girder having hook-seats, of comb-frames provided with hooks that are adapted to engage with said seats to suspend said frames from said bar, and a top or honey board operative to lock the hooks in their seats and to cover and protect the hooks and hook-seats, from propolis, substantially as described.

3. In a beehive, the combination with a removable top bar or girder having hook-seats, of comb-frames having hooks that are adapted to independently engage with said seats in any order to suspend the frame from said bar, whereby the comb-frames are rendered removable both independently and collectively from the hive, substantially as described.

4. In a beehive, the combination with the removable overhead bar or girder having hook-seats, of comb-frames having hooks adapted to independently engage with said seats, and cleats on the hive-walls which coöperate with said bar and said hooks to hold said comb-frames in proper working position, substantially as described.

5. In a beehive, the combination with the base-board $a$ and the wall-boards $a'$ $a^2$ $a^3$ $a^4$, of the cleat $a^{10}$ on the board $a^3$, the rabbeted cleat $a^{11}$ on the removable or door board $a^4$, the removable top bar $b$ with the hook-seats $b'$ $b^2$ as described, the comb-frames $b^3$ with the top hooks $b^4$, and the honey or top boards $ff'$, all arranged and coöperating substantially as described.

In testimony whereof I affix my signature in presence of two witnesses.

CYRUS C. ALDRICH.

Witnesses:
J. P. TEMPLE,
A. H. RIDGEWAY.